United States Patent
Inoue et al.

(10) Patent No.: US 7,589,745 B2
(45) Date of Patent: Sep. 15, 2009

(54) IMAGE SIGNAL PROCESSING CIRCUIT AND IMAGE DISPLAY APPARATUS

(75) Inventors: Kenji Inoue, Hiratsuka (JP); Kenichiro Ono, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 693 days.

(21) Appl. No.: 11/118,405

(22) Filed: May 2, 2005

(65) Prior Publication Data

US 2005/0248585 A1 Nov. 10, 2005

(30) Foreign Application Priority Data

May 6, 2004 (JP) .............................. 2004-137627

(51) Int. Cl.
- G06F 13/00 (2006.01)
- G09G 5/00 (2006.01)
- G06K 9/32 (2006.01)

(52) U.S. Cl. ....................... 345/619; 345/536; 345/649; 345/654; 345/656; 382/296; 382/297

(58) Field of Classification Search ................. 345/619, 345/649, 654, 656–658, 536–537; 382/296–297
See application file for complete search history.

(56) References Cited

U.S. PATENT DOCUMENTS

| | | | |
|---|---|---|---|
| 4,570,158 A | 2/1986 | Bleich et al. ................. 340/727 |
| 5,034,733 A | 7/1991 | Okazawa et al. ............. 340/727 |
| 5,781,823 A * | 7/1998 | Isobe et al. ..................... 399/2 |
| 6,040,826 A | 3/2000 | Furukawa ................... 345/196 |
| 6,121,947 A | 9/2000 | Furuhashi et al. ............. 345/98 |
| 6,176,780 B1 * | 1/2001 | Miyamoto et al. ............. 463/4 |
| 6,954,207 B2 * | 10/2005 | Song et al. ................... 345/536 |
| 2002/0085123 A1 | 7/2002 | Ono ............................. 348/584 |
| 2003/0189674 A1 | 10/2003 | Inoue et al. ................. 348/738 |
| 2004/0046773 A1 | 3/2004 | Inoue et al. ................. 345/698 |

(Continued)

FOREIGN PATENT DOCUMENTS

EP 1 507 249 A1 2/2005

(Continued)

OTHER PUBLICATIONS

Sep. 27, 2007 European Search Report in European Patent Application No. 05 00 9444.

*Primary Examiner*—Xiao M Wu
*Assistant Examiner*—Tize Ma
(74) *Attorney, Agent, or Firm*—Fitzpatrick, Cella, Harper & Scinto

(57) ABSTRACT

An image signal processing circuit, comprising: a first memory part; a second memory part; and a control circuit which controls the first memory part and the second memory part, wherein the image signal processing circuit is constituted so that image signals outputted from one of the first memory part and the second memory part are inputted into the other of the first memory part and second memory part; and wherein the control circuit is a circuit which controls the first memory part so that image signals are outputted in inverse order from the first memory part to inputted order into the first memory part, and controls the second memory part so that image signals are outputted in inverse order of lines composed of image signals from the second memory part to inputted order of lines composed of image signals into the second memory part.

6 Claims, 10 Drawing Sheets

U.S. PATENT DOCUMENTS

| | | | |
|---|---|---|---|
| 2004/0184776 A1 | 9/2004 | Inoue et al. | 386/83 |
| 2004/0212732 A1 | 10/2004 | Matsuzaki et al. | 348/452 |
| 2004/0246375 A1 | 12/2004 | Matsuzaki et al. | 348/452 |
| 2005/0073695 A1* | 4/2005 | Nacman et al. | 358/1.2 |
| 2005/0114901 A1 | 5/2005 | Yui et al. | 725/100 |
| 2005/0125819 A1 | 6/2005 | Ono et al. | 725/14 |
| 2005/0169610 A1 | 8/2005 | Ono | 386/124 |
| 2005/0212961 A1 | 9/2005 | Matsuzaki et al. | 348/452 |

FOREIGN PATENT DOCUMENTS

| | | |
|---|---|---|
| JP | 61-43080 | 3/1986 |
| JP | 63-155865 | 6/1988 |
| JP | 07-152905 | 6/1995 |
| JP | 11-296145 | 10/1999 |
| JP | 2001-343966 | 12/2001 |
| JP | 2002137460 A * | 5/2002 |

* cited by examiner

IMAGE SIGNAL PROCESSING CIRCUIT AND IMAGE DISPLAY APPARATUS

BACKGROUND OF THE INVENTION

1. Field of the Invention

The present invention relates to an image signal processing circuit and an image display apparatus. In particular, the present invention is preferable for application to an image signal processing circuit for displaying image data and a television signal on an image display apparatus, wherein the image data and the television signal are outputted from a computer.

2. Related Background Art

Heretofore, there are various types of images, which are displayed on an image display apparatus, such as a computer graphic, an image of a digital camera, and an image of a television signal. Then, there are a large number of formats of these images.

In an image display apparatus where formats of these images for display are fixed, it is possible to correspond to this format of image by selecting an image display apparatus fit to the image format. In a general-purpose image display apparatus, however, in order to display an image on the image display apparatus, it is necessary to give image processing to the image.

There exists IP conversion, frame rate conversion, resolution conversion, or the like representatively as image processing executed when displaying an image on this image display apparatus. The IP conversion among these converts an interlace signal like an NTSC signal of a television signal into a progressive signal. In addition, frame rate conversion is the conversion of a switching rate of a screen. Furthermore, the resolution conversion converts the number of horizontal pixel and vertical scanning lines.

When executing these types of image processing, the structure using frame memory is known. This frame memory stores image data for one screen, and reads the data as required for image processing. Then, it becomes possible to perform not only the image processing mentioned above but also to perform executing special image processing by adopting this frame memory.

Moreover, the technology of performing inversion, rotation, enlargement and shrinkage of an image is disclosed in Japanese Patent Application Laid-Open No. 1995-152905 by controlling the sequence of writing into or reading from frame memory.

In addition, generally, the multi-screen display which displays a plurality of screens on one image display apparatus has been performed in recent years. Then, with regard to this multi-screen display, methods of performing a multi-screen display by using a plurality of memory spaces are disclosed in Japanese Patent Application Laid-Open No. 1995-152905 and Japanese Patent Application Laid-Open No. 1999-296145.

Furthermore, Japanese Patent Application Laid-Open No. 2001-343966 discloses a method of image processing such as inversion and rotation by using a burst mode of SDRAM (Synchronous DRAM). This method aims at achieving the processing such as inversion and rotation by following method. An image data is divided into blocks, each of which is composed of predetermined numbers of pixels vertically and horizontally. The processing is performed such as inversion and rotation, and the like of data in a block by replacing the order of data in the block, performing burst transmission for every block. And the order of writing or reading of the block concerned is replaced.

By the way, when performing real-time processing using frame memory such as SDRAM, it is preferable to use a burst mode of SDRAM.

Then, as shown in FIG. 10, in this burst mode, it becomes possible continuously to perform data transfer using pipeline processing. An address count in the burst mode, however, becomes count-up in a sequential or interleaved mode. Hence, it is very hard to use the burst mode to the technology described in Japanese Patent Application Laid-Open No. 1995-152905 and Japanese Patent Application Laid-Open No. 1999-296145.

Specifically, in the methods described in Japanese Patent Application Laid-Open No. 1995-152905 and Japanese Patent Application Laid-Open No. 1999-296145, it is necessary to specify a row address and a column address for every access to memory. Furthermore, in moving image processing, it is necessary to enhance the processing speed of a memory access.

SUMMARY OF THE INVENTION

The present invention aims to provide an image processing apparatus, which can execute inversion display in a comparatively simple circuit structure, and an image display apparatus equipped with this image processing apparatus.

The first aspect of the invention is an image signal processing circuit, comprising: a first memory part; a second memory part; and a control circuit which controls the first memory part and the second memory part, wherein the image signal processing circuit is constituted so that image signals outputted from one of the first memory part and the second memory part are inputted into the other of the first memory part and second memory part; and wherein the control circuit is a circuit which controls the first memory part so that image signals are outputted inverse order from the first memory part to inputted order into the first memory part, and controls the second memory part so that image signals are outputted inverse order of lines composed of image signals from the second memory part to inputted order of lines composed of image signals into the second memory part.

DESCRIPTION OF THE PREFERRED EMBODIMENTS

Figure 1:
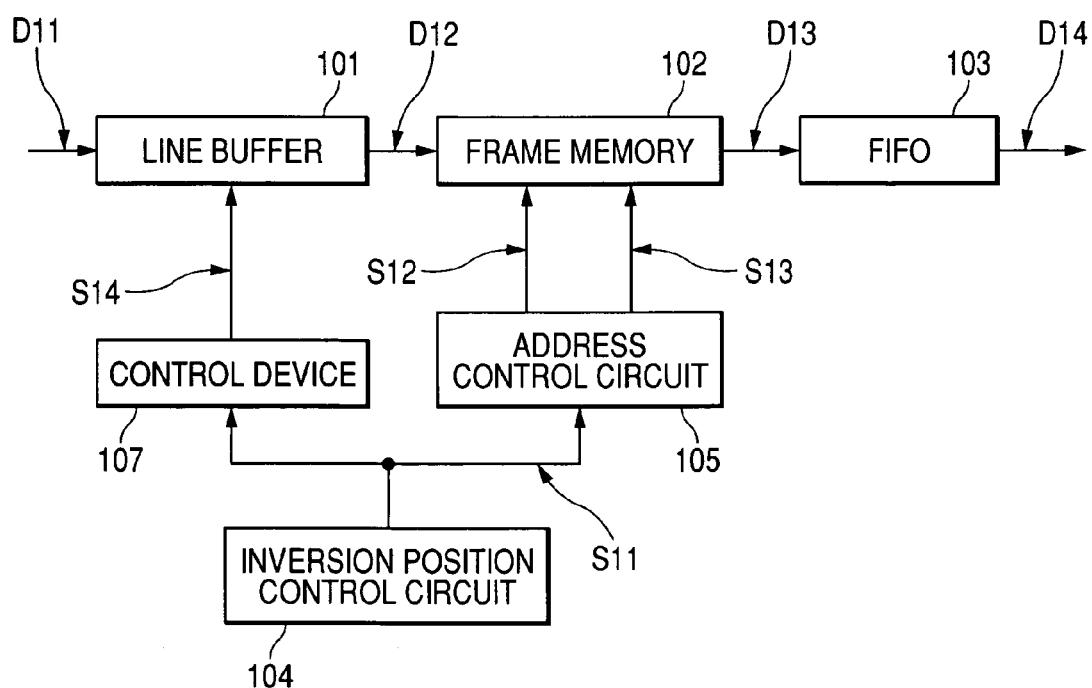
FIG. 1 is a block diagram showing the structure of an image processing apparatus according to a first embodiment of this invention.

Hereafter, embodiments of the present invention will be described with reference to the drawings. In addition, in all the Figures in the following embodiments, the same reference characters are assigned to the same or corresponding parts.

In addition, as an embodiment of this invention, a case of monitoring a read address or a write address of a line buffer and frame memory, and performing "inversion processing" in a stage when the address becomes a value arbitrarily set by a user will be explained. Then, three kinds of embodiments where the structure of reading and writing of image data differs will be explained.

In the present invention, one line means image data corresponding to one column which constitutes an image displayed on the basis of image data. In addition, image data is constituted by a set of image signals which are corresponding to respective pixels of an image displayed on the basis of the image data.

The image signal is a signal containing an information concerned with a luminosity of a corresponding pixel. That is, the image signal is a pixel signal.

Further, according to the present invention, the image signal outputted from a first memory part in an inverse order opposite to an input order is desirably an image signal of one line or smaller.

Figure 11:
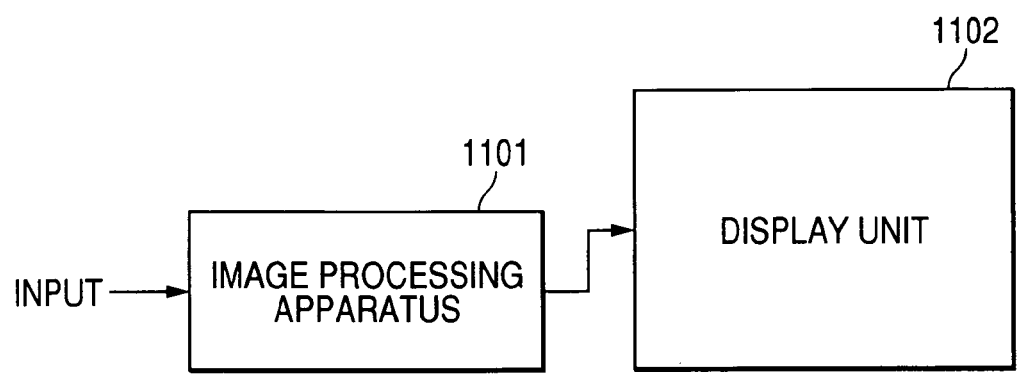
FIG. 11 is a block diagram showing the structure of an entire image display apparatus according to an embodiment of this invention.

First, the entire configuration of an image display apparatus in the embodiment explained below is shown in FIG. 11. Thus, based on signals outputted from an image processing apparatus 1101, an image is displayed on a display unit 1102. This image processing apparatus 1101 has an image signal processing circuit, and will be explained in detail in each of the following embodiments. In addition, this invention is preferable for applications to a system of performing collaboration among a small number of people with performing the flat placement of a large screen image display apparatus. It becomes possible to perform the inversion multi-display which enhances visibility when a display is flatly placed and the same outputted image is seen from up-and-down directions. It is possible to use, for example, a CRT, a plasma display, a liquid crystal display, an EL display, or a flat-panel display which uses an electron-emitting device, as such a display unit 1102. In addition, so as to flatly place a display, the display is equipped with a support device such as a stand which enables the flat placement. In addition, flat placement means that the display unit 1102 is installed so that an angle at which a normal in the center of a display surface of the display unit 1102 intersects a normal of a face on which the display unit 1102 is installed may become 30° to 90°.

First Embodiment

First, an image processing apparatus according to a first embodiment of this invention will be explained. FIG. 1 shows the structure of an image processing apparatus according to the first embodiment of this invention. In addition, in this first embodiment, a case that an address is controlled when the writing or reading of image data to frame memory and line order inversion control is executed will be explained.

As shown in FIG. 1, the image processing apparatus according to this first embodiment comprises a line buffer 101, frame memory 102, a FIFO (First-In First-Out) type buffer (hereafter, FIFO) 103, an inversion position control circuit 104, an address control circuit 105, and a control device 107. In the first embodiment, the line buffer 101 is the first memory part, the frame memory 102 is the second memory part, and the control device 107 and address control circuit 105 are the control circuit. In addition, the first memory part may be memory where column inversion processing is possible, and memory with small capacity is preferable so that a hardware scale may become small. As such memory, a line buffer can be used preferably.

In addition, in FIG. 1, a signal supplied to the control device 107 and address control circuit 105 from the inversion position control circuit 104 is a column inversion position indication signal S11, and signals supplied to the frame memory 102 from the address control circuit 105 are a write address S12 and a read address S13. Furthermore, a signal supplied to the line buffer 101 from the control device 107 is an addressing signal S14. Moreover, data outputted and inputted inside this image processing apparatus are input image data D11, image data D12 read from the line buffer 101, image data D13 read from the frame memory 102, output image data D14 from the FIFO 103, and the like.

Figure 2A:
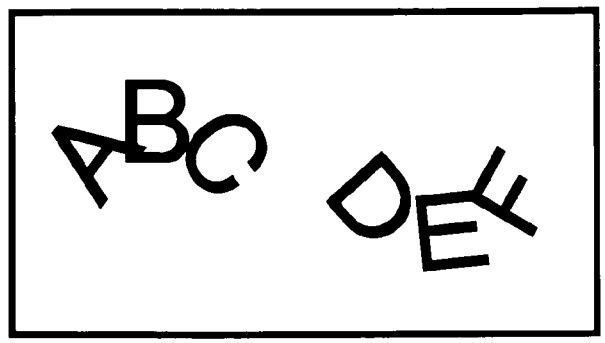
FIGS. 2A, 2B and 2C are a schematic diagram showing an example of a virtual image displayed on the basis of input image data, a schematic diagram showing an example of a virtual image displayed on the basis of image data read from a line buffer, and a schematic diagram showing an example of a virtual image displayed on the basis of inversion multi-output image data, respectively, according to the first embodiment of this invention.

A virtual image at the time of being displayed by an image display apparatus, not shown, on the basis of the input image data D11 among these data is shown in FIG. 2A. The input image data D11 displayed in this way is first supplied to the line buffer 101 shown in FIG. 1, and is stored for every line. In addition, when a user inputs information on a column inversion position from the outside, this information data about a column inversion position is inputted into the inversion position control circuit 104. When the column inversion position indication signal S11 based on this information about the column inversion position set by the user to a control device 107 is supplied, the addressing signal 514 in column inversion processing is supplied to the line buffer 101 from the control device 107.

Next, image data is outputted from the line buffer 101, to which the addressing signal S14 is supplied, with being counted up to the column inversion position set beforehand by the user. Then, after reaching the column inversion position, the line buffer 101 is controlled so that the image data which is sequentially inputted may be outputted to the line buffer 101 in the inverse order to the entry order. Thus, on the basis of a position with a number obtained by subtracting the number of pixels, having been already outputted, from an output pixel count per one line, the image data is outputted with being sequentially counted down.

Figure 2B:
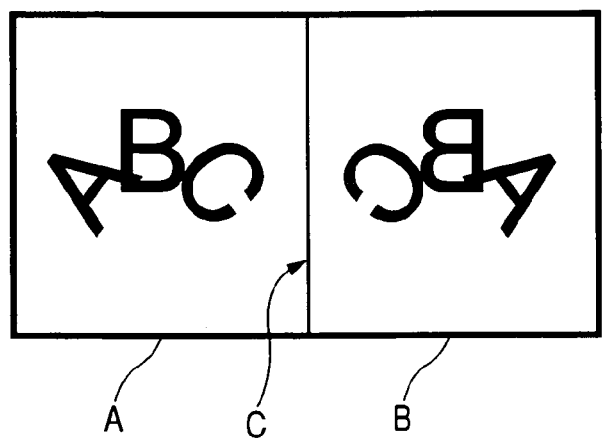

Thus, a virtual image at the time of being displayed by the image display apparatus, not shown, on the basis of the image data D12 which is read from the line buffer 101 and is supplied to the frame memory 102 is shown in FIG. 2B. Supposing the image is displayed by an image display apparatus on the basis of the image data D12, a part of the image displayed on the basis of image data inputted into the line buffer 101, and an image which is the part of the image which is inverted on the same face with making an axis orthogonal to a line of the above-mentioned image center are shown.

Actually, since becoming data written into the frame memory 102, the image data D12 is transferred to the frame memory 102 with plural pixel transfer is performed, or with once being stored in an asynchronous FIFO (all are not shown) and a clock frequency being raised. In addition, in FIG. 2B, as an example of the case of an approximate center of a display screen becoming a column inversion position, a "portion which A shows" shows an image in a left-hand side of the input image data D11, a "portion which B shows" shows an image which is the image in the left-hand side which is given column inversion, and a "line which C shows" shows an inversion indication position determined by the column inversion position information inputted from the inversion position control circuit 104.

On the other hand, as shown in FIG. 1, the column inversion position indication signal S11 is supplied also to the address control circuit 105. Then, the address control circuit 105 controls the frame memory 102 so that a part of image signals for two or more lines which is inputted into the frame memory 102 may be outputted in entry order, and the other part may be inverted in line order and may be outputted. That is, the address control circuit 105 executes the line order inversion processing on the basis of the column inversion position to either of the write address S12 and read address S13 to the frame memory 102 with following the column inversion position indication signal S11.

Figure 3:
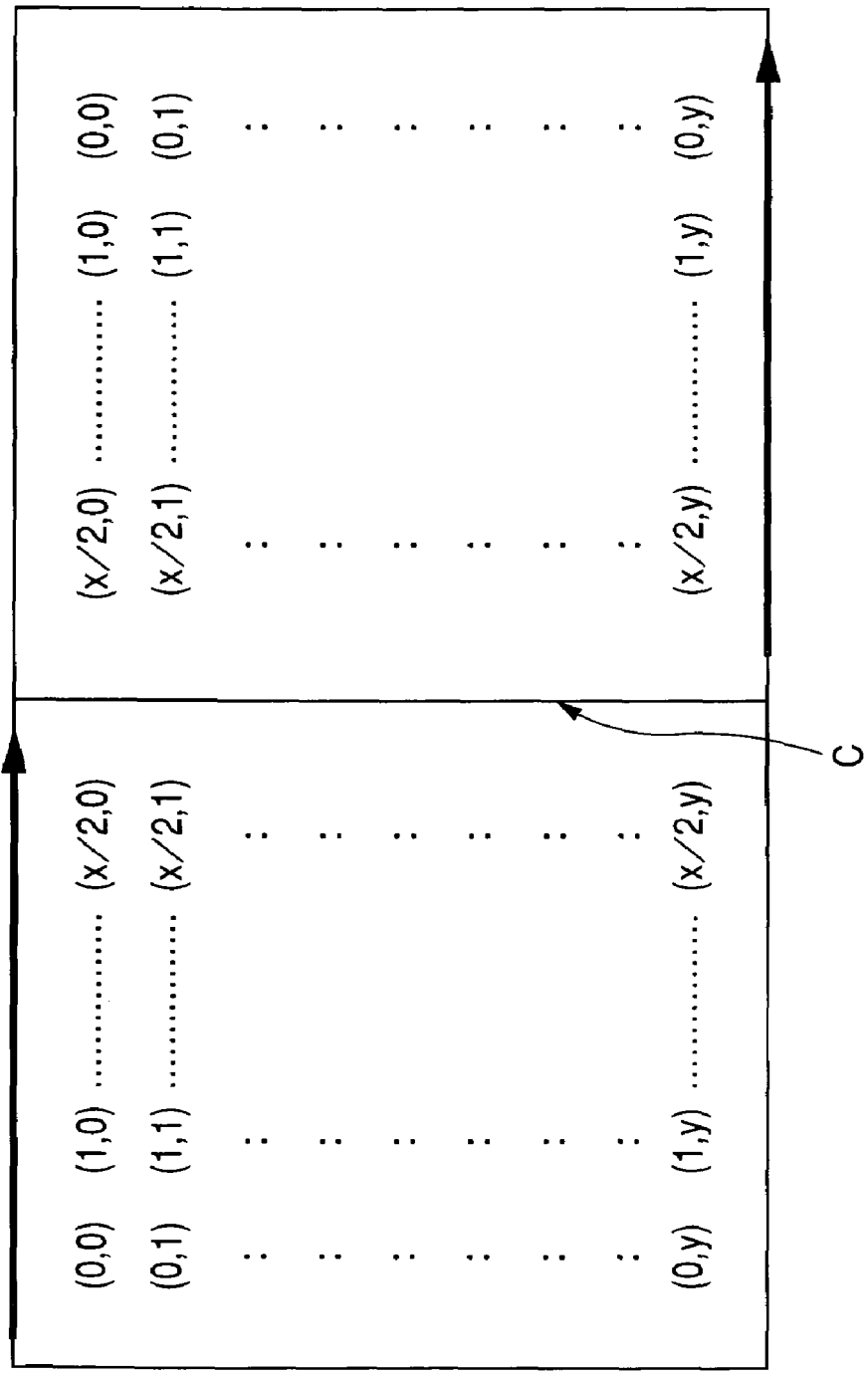
FIG. 3 is a schematic diagram for explaining the order of reading from frame memory in image processing according to the first embodiment of this invention.
Figure 4:
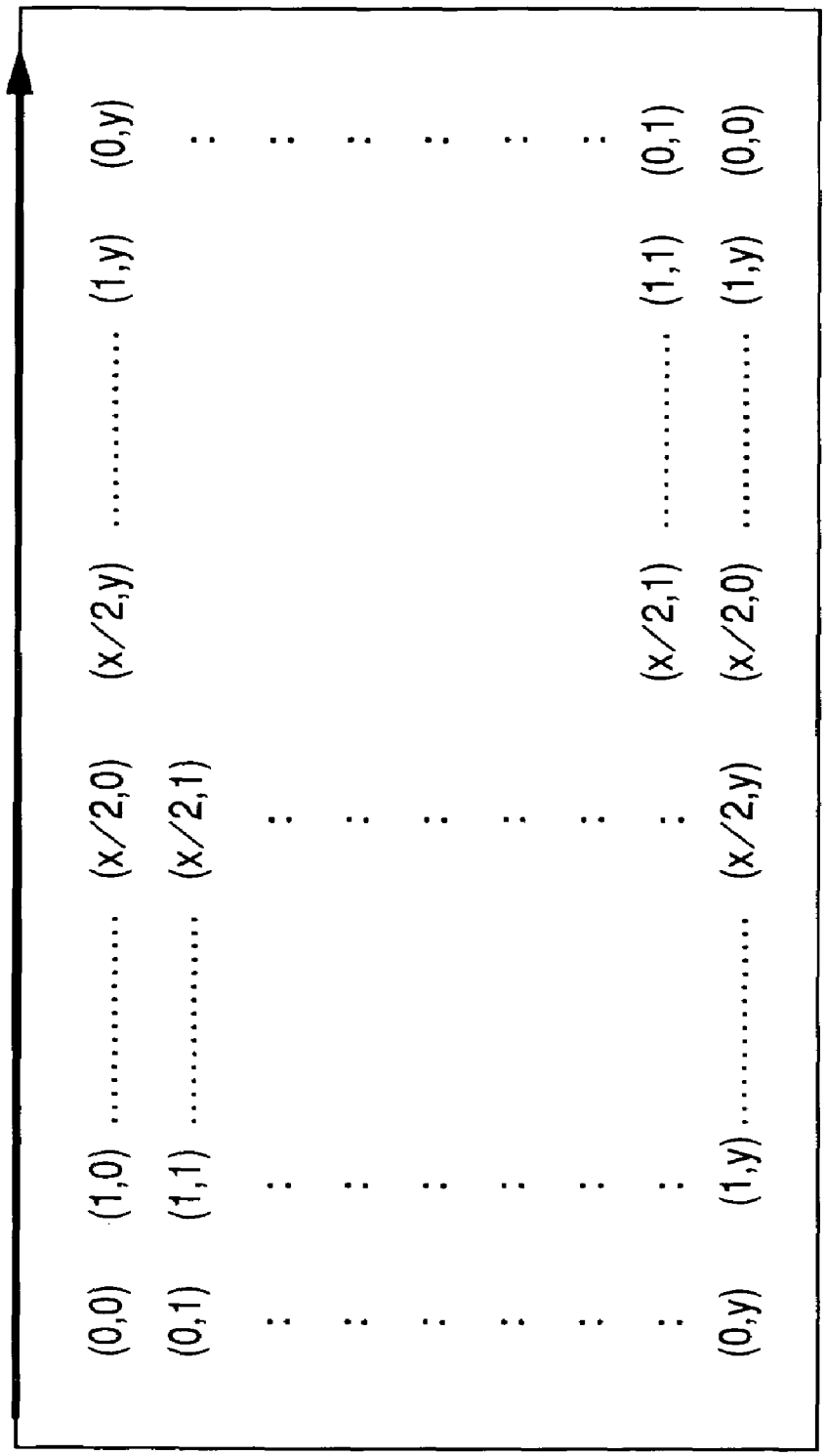
FIG. 4 is a schematic diagram for explaining the order of reading from frame memory in image processing according to the first embodiment of this invention.

Next, an example of image data arrangement of the image data D13 read from the frame memory 102 is shown in FIGS. 3 and 4. In FIGS. 3 and 4, the coordinates of the upper left edge of the input image data D11 is (0, 0) and the coordinates of the lower right edge is (x, y). In addition, arrows in FIGS. 3 and 4 show the read order.

FIG. 3 shows an example of the case of performing the line order inversion processing at the time of reading without executing the line order inversion processing at the time of write control to the frame memory 102. Thus, when data is sequentially read from the position of coordinates (0, 0) along the direction of the arrow according to pixel data shown in FIG. 3 and reaches the column inversion position C, line order inversion is performed. On the other hand, FIG. 4 shows an example of the case of not performing the line order inversion processing at the time of reading with executing the line order inversion processing at the time of write control to the frame memory 102. Thus, data is sequentially read in the direction of the arrow from the position of coordinates (0, 0), and data is sequentially read as it is regardless of the column inversion position C. In addition, which structure is adopted is possible arbitrarily to be determined according to circuit configuration.

As described above, the line order inversion processing is executed at the column inversion position at the time of reading control or writing control, on the basis of the column inversion position information which is determined by a user and is inputted into the inversion position control circuit 104. Then, the image data D13 read from the frame memory 102 is once stored in the FIFO 103 for every line, and is outputted in accordance with output timing. Thereby, supposing the image is displayed by an image display apparatus on the basis of the image data D13, a part of the images displayed on the basis of the image data inputted into the frame memory 102, and an image which is the part of the image which is inverted on the same face with making an axis parallel to a line of the above-mentioned image center are shown.

Figure 2C:
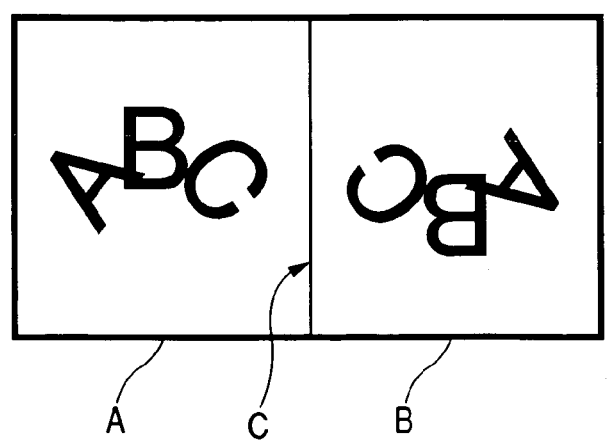

Then, supposing the image is displayed by the image display apparatus, not shown, on the basis of the output image data D14 to be outputted, as shown in FIG. 2C, a part of the image displayed on the basis of the image data inputted into the line buffer 101 is displayed in an inversion direction in a state of rotating on the same face to the other part. Thus, it becomes possible to achieve inversion multi-display.

Second Embodiment

Figure 5:
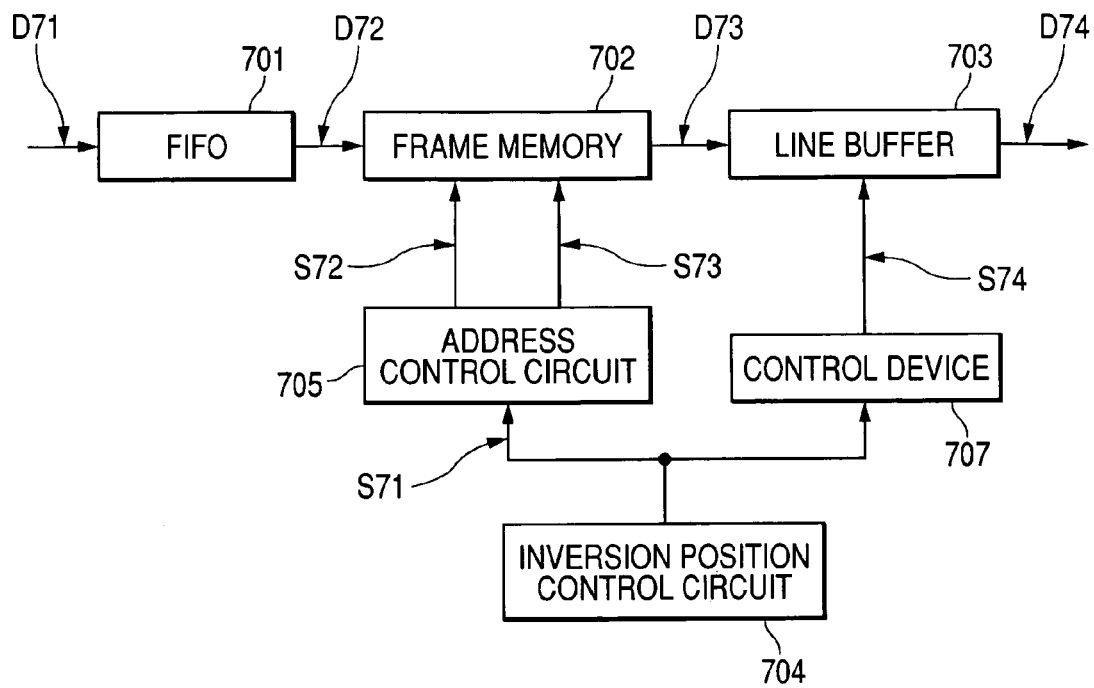
FIG. 5 a block diagram showing the structure of an image processing apparatus according to a second embodiment of this invention.

Next, an image processing apparatus according to a second embodiment of this invention will be explained. FIG. 5 shows the image processing apparatus according to the second embodiment of this invention. In addition, in this second embodiment, a case of executing line order inversion processing when the reading of image data from frame memory is executed will be explained.

As shown in FIG. 5, the image processing apparatus according to this second embodiment comprises a FIFO 701, a frame memory 702, a line buffer 703, an inversion position control circuit 704, an address control circuit 705, and a control device 707. In the second embodiment, the line buffer 703 is the first memory part, the frame memory 702 is the second memory part, and the control device 707 and address control circuit 705 are the control circuit. In addition, in FIG. 5, data inputted into the FIFO 701 from the outside is input image data D71, data which is read from this FIFO 701 and is supplied to the frame memory 702 is image data D72, data which is read from the frame memory 702 and is supplied to the line buffer 703 is image data D73, and data outputted from the line buffer 703 is output image data D74. Furthermore, a column inversion position indication signal S71 is outputted from the inversion position control circuit 704, and is supplied to the address control circuit 705 and control device 707. Moreover, a write address S72 and a read address S73 are outputted from the address control circuit 705, and is supplied to the frame memory 702. In addition, an addressing signal S74 for line inversion processing is supplied to the line buffer 703 from the control device 707.

First, the input image data D71 supplied from the outside is once stored in the FIFO 701 for every line. The image data D72 read from the FIFO 701 according to the write timing of the frame memory 702 is stored in the frame memory 702 according to the write address S72 outputted from the address control circuit 705.

Figure 7:
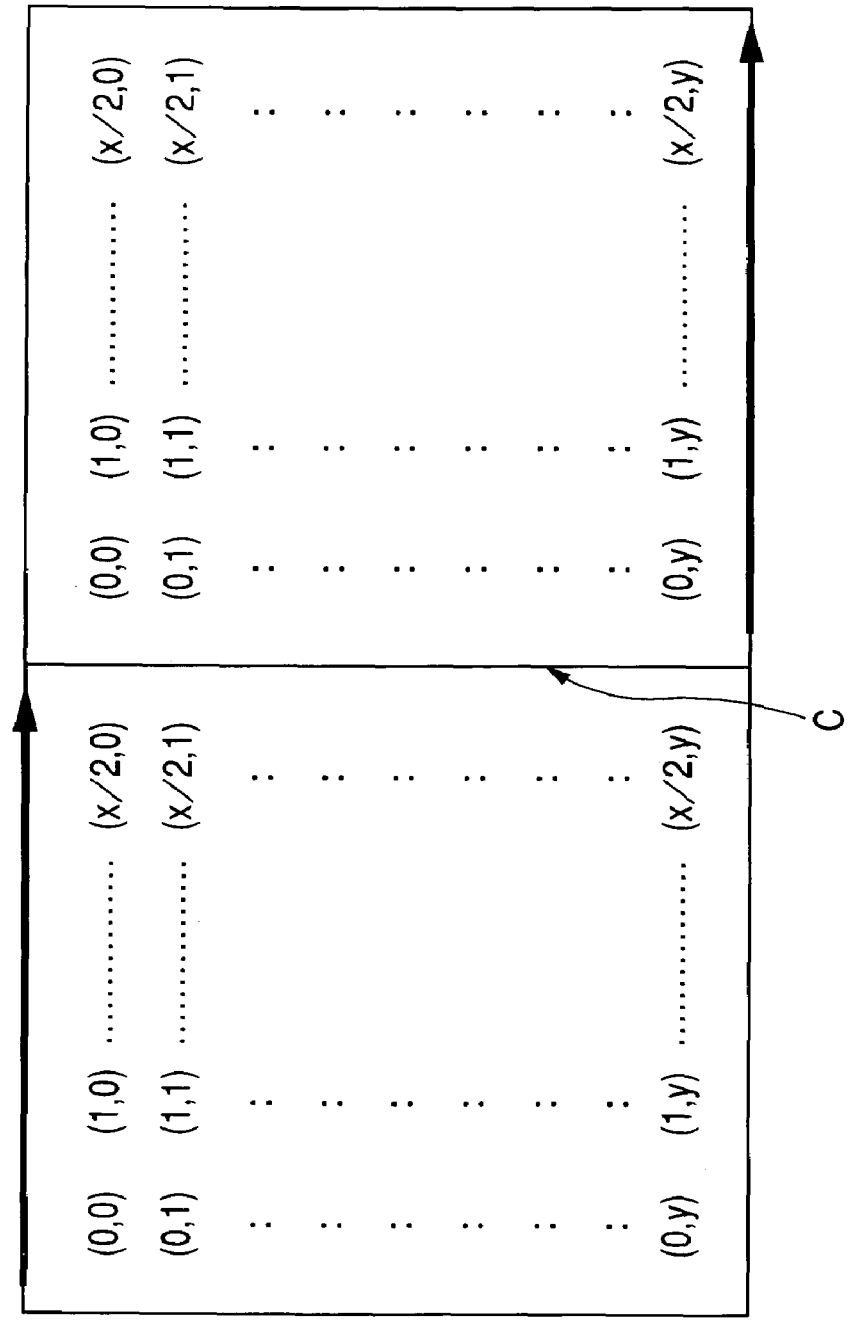
FIG. 7 is a schematic diagram for explaining the order of reading from the frame memory in image processing according to the second embodiment of this invention.

As for image data stored in this frame memory 702, it is possible to cite data shown in FIG. 7 as an example. In this example shown in FIG. 7, only the data in a left-hand side of the column inversion position C in the input image data D71 are stored in the frame memory 702. Data stored in the right side of the column inversion position in the frame memory 702 is generated by reading the data in the left-hand side of the column inversion position in the input image data D71 twice, and is stored in the frame memory 702.

Then, the address control circuit 705 controls the frame memory 702 so that a part of image signals for two or more lines which is inputted into the frame memory 702 may be outputted in entry order, and the other part may be inverted in line order and may be outputted. That is, the address control circuit 705 executes the line order inversion processing on the basis of the column inversion position to an address of the read address S73 from the frame memory 702 with following the column inversion position indication signal S71. Thereby, supposing the image is displayed by an image display apparatus on the basis of the image data D73 read from the frame memory 702, a part of the image displayed on the basis of the image data inputted into the frame memory 702, and an image which is the part of the image which is inverted on the same plane as a center which is an axis parallel to a line of the above-mentioned image are shown.

Figure 6:
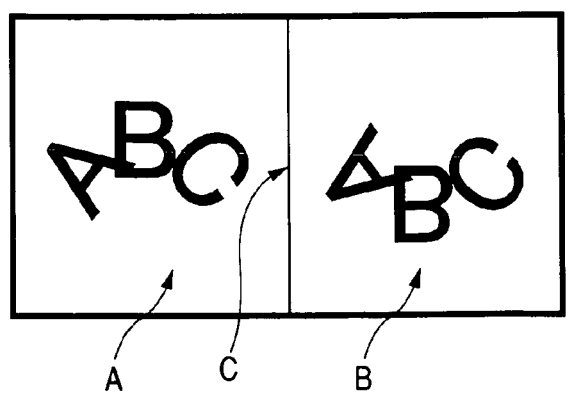
FIG. 6 is a schematic diagram showing a virtual image displayed on the basis of image data read from frame memory in image processing according to the second embodiment of this invention.

An example of a virtual image at the time of being displayed by the image display apparatus, not shown, on the basis of the image data D73 which is read as mentioned above is shown in FIG. 6. In FIG. 6, a "portion which A shows" shows the left-hand part of the input image data D71, and a "portion which B shows" is an image which is obtained by inverting the "portion which A shows", that is, the left-hand side of the input image data vertically. In addition, a "portion which C shows" is a column inversion position which is set by a user and stored in the inversion position control circuit 704.

Then, the image data D73 read from the frame memory 702 is supplied and stored in the line buffer 703 for every line. After that, the data stored in the line buffer 703 is read according to the output timing by the addressing signal S74 outputted from the control device 707. At this time, image data is counted up to the column inversion position according to the addressing signal S74 including information about the column inversion position, and is outputted. Then, the line buffer 703 is controlled at a stage of becoming the column inversion position so that the image data which is sequentially inputted into the line buffer 703 may be outputted in the inverse order to the entry order. Thus, on the basis of a position according to one line of output pixel count, the image data is outputted with being sequentially counted down to the column inversion position. As described above, column inversion processing is executed by the control device of the line buffer 703, and the output image data D74 is outputted.

Then, supposing the image is displayed by an image display apparatus, not shown, on the basis of the output image data D74 outputted, a part of the image displayed on the basis of image data inputted into the line buffer 703, and an image which is the other part of the image which is inverted on the same plane as a center which is an axis orthogonal to a line of the above-mentioned image are shown.

Thereby, supposing the image is displayed by an image display apparatus, not shown, on the basis of the output image data D74 to be outputted, as shown in FIG. 2C, a part of the image displayed on the basis of the image data inputted into the line buffer 703 is displayed in an inversion direction in a state of rotating on the same plane to the other part. Thus, it becomes possible to output the image data as data which can be used for inversion multi-display.

Third Embodiment

Figure 8:
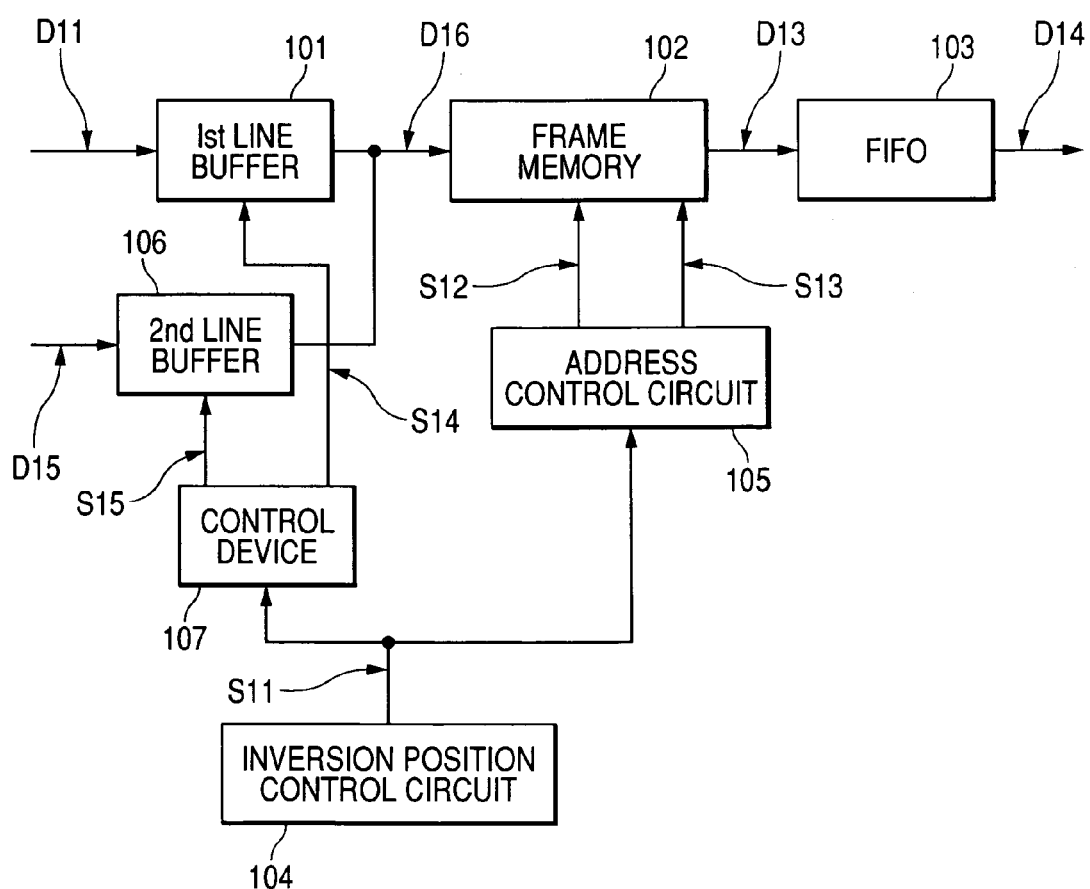
FIG. 8 is a block diagram showing the structure of an image processing apparatus according to a third embodiment of this invention.

Next, an image processing apparatus according to a third embodiment of this invention will be explained. FIG. 8 shows the image processing apparatus according to this third embodiment, and the same reference numerals will be assigned to the same components as those in the first embodiment. In addition, in this third embodiment, a case of executing line order inversion processing at the time of the writing of image data into frame memory will be explained.

As shown in FIG. 8, the image processing apparatus according to this third embodiment comprises a first line buffer 101, a frame memory 102 and a FIFO 103, an inversion position control circuit 104, an address control circuit 105, a second line buffer 106, and a control device 107. In the third embodiment, the first line buffer 101 and second line buffer 106 are the first memory part, the frame memory 102 is the second memory part, and the control device 107 and address control circuit 105 are the control circuit.

In addition, in FIG. 8, data similar to those in the first embodiment are the first input image data D11 inputted and stored in the first line buffer 101 from the outside, the image data D13 which is read from the frame memory 102 and supplied to the FIFO 103, and the output image data D14 outputted from the FIFO 103. Furthermore, in this third embodiment, second input image data D15 is inputted into the second line buffer 106 from the outside, and data read from the first line buffer 101 and second line buffer 106 are supplied to the frame memory 102 as image data D16.

Furthermore, the column inversion position indication signal S11 supplied to the control device 107 and address control circuit 105 by the inversion position control circuit 104 is an order signal for indicating the column inversion position which is the "portion which C shows" in FIG. 9. Moreover, the write address S12, read address S13, and addressing signals S14 and S15 are the same as those in first embodiment.

First, while the first input image data D11 is inputted and stored in the first line buffer 101, the second input image data D15 is inputted and stored in the second line buffer 106.

In addition, the control device 107 controls the enablement and read start positions of the first line buffer 101 and second line buffer 106 by the column inversion position indication signal S11 outputted from the inversion position control circuit 104. Thus, when the first line buffer 101 is enabled to be read, the second line buffer 106 is disabled to be read. On the other hand, when the first line buffer 101 is disabled to be read, the second line buffer 106 is enabled to be read. In addition, the column inversion processing is executed at the time of reading image data from the second line buffer 106.

Specifically, image data is read from the first line buffer 101 and second line buffer 106 as follows.

First, image data to the column inversion position beforehand set by a user is sequentially counted up and is outputted from the first line buffer 101 to which the addressing signal S14 is supplied. Then, at a stage of becoming the column inversion position, the image data which is sequentially inputted into the second line buffer 106 by the addressing signal S15 is outputted in the inverse order to the entry order. Thus, on the basis of a position with a number obtained by subtracting the number of pixels, already outputted, from an output pixel count per one line, the image data from the second line buffer 106 is outputted with being sequentially counted down.

Thus, the data obtained by switching and synthesizing output data from the first line buffer 101 and output data from the second line buffer 106 are supplied to the frame memory 102 as the image data D16.

Thereby, supposing the image is displayed by an image display apparatus on the basis of the image data D16, a part of an image displayed on the basis of image data inputted into the first line buffer 101, and an image which is the part of an image, displayed on the basis of image data inputted into the second line buffer 106, which is inverted on the same plane as a center which is an axis orthogonal to a line of the above-mentioned image are shown.

Next, the writing into the frame memory 102 is controlled by the write address S12. In addition, the reading from the frame memory 102 is controlled by the read address S13. In addition, the write address S12 and read address S13 are generated by the address control circuit 105.

The line order inversion in the write address S12 is executed according to the column inversion position indication signal S11 outputted from the inversion position control circuit 104 by this address control circuit 105. The address control circuit 105 controls the frame memory 102 so that a part of image signals for two or more lines which is inputted into the frame memory 102 may be outputted in entry order, and the other part may be inverted in line order and may be outputted. That is, the address control circuit 105 executes the line order inversion processing on the basis of the column inversion position to the write address S12 into the frame memory 102 with following the column inversion position indication signal S11. Thereby, supposing the image is displayed by an image display apparatus on the basis of the image data D13 read from the frame memory 102, a part of the image displayed on the basis of the image data inputted into the frame memory 102, and an image which is the other part of the image which is inverted on the same plane as a center which is an axis parallel to a line of the above-mentioned image are shown.

Then, the image data D13 read from the frame memory 102 is stored in the FIFO 103. Then, after being stored in the FIFO 103, the image data D13 is outputs as outputted as the image data D14 in accordance with the timing of an image display apparatus (not shown).

Supposing the image is displayed by the image display apparatus, not shown, on the basis of the output image data D14 to be outputted, a part of the image displayed on the basis of the image data inputted into the first line buffer 101 and second line buffer 106 is displayed in an inversion direction in a state of rotating on the same plane to the other part of the image. Thus, it becomes possible to achieve inversion multi-display.

Figure 9A:
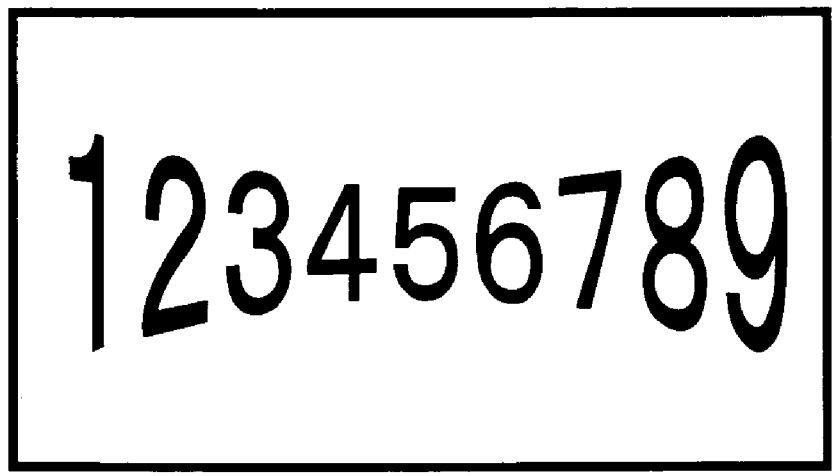
FIGS. 9A and 9B are schematic diagrams showing an example of a virtual image displayed on the basis of input image data, and an example of a virtual image displayed on the basis of output image data, respectively, according to the third embodiment of this invention.
Figure 9B:
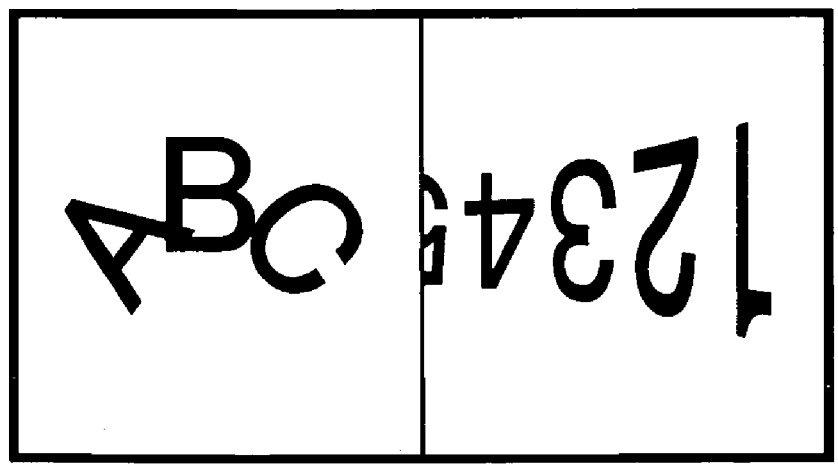
Figure 10:
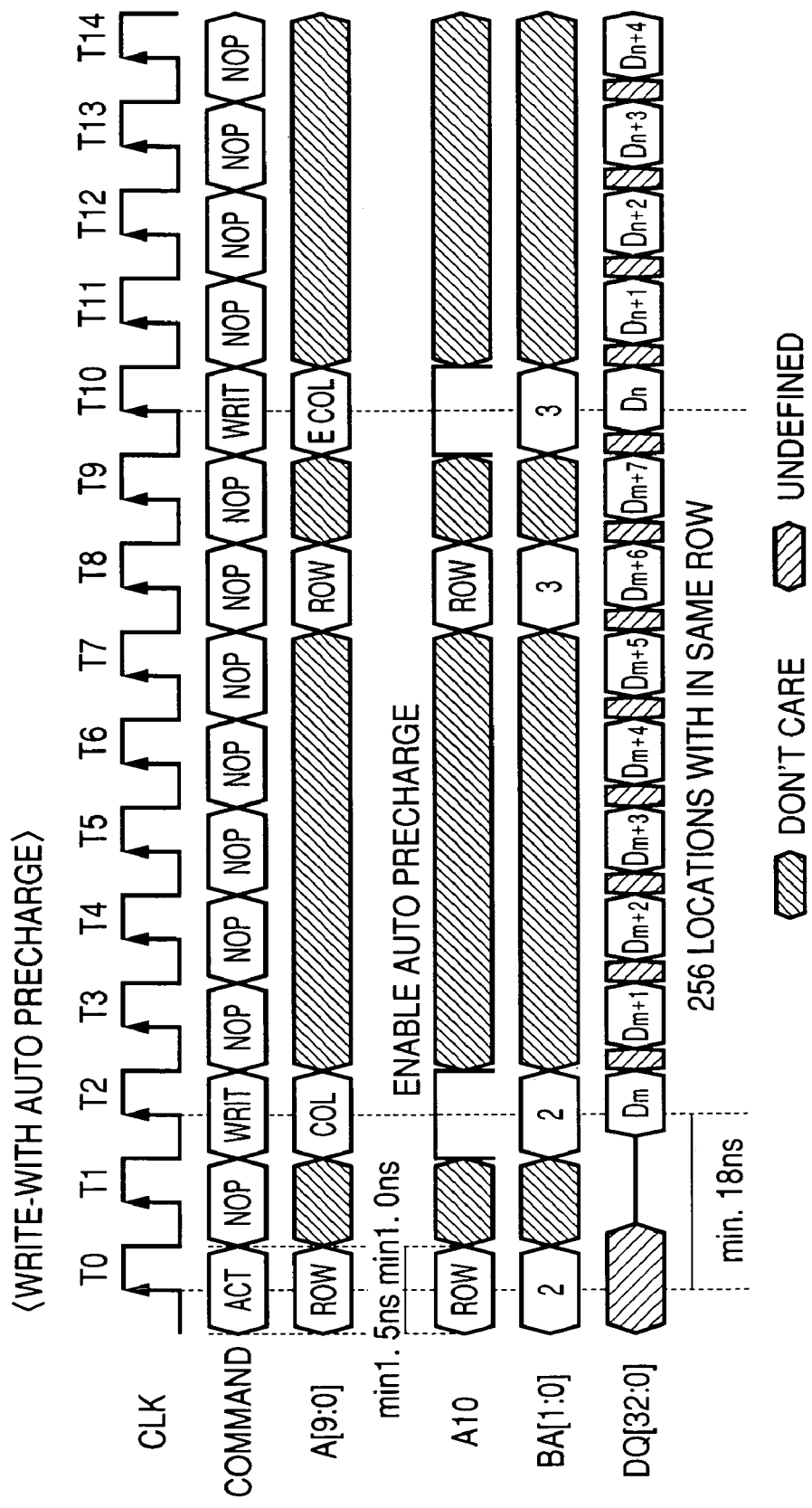
FIG. 10 is a timing chart for explaining a burst mode of SDRAM according to conventional art.

Here, as an example, suppose a virtual image at the time of being displayed by an image display apparatus, not shown, on the basis of the input image data D11 is shown in FIG. 2A, and a virtual image at the time of being displayed by an image display apparatus, not shown, on the basis of the input image data D15 is shown in FIG. 9A. At this time, a virtual image at the time of being displayed by an image display apparatus, not shown, on the basis of the output image data D14 outputted from the image processing apparatus according to this third embodiment becomes an image in FIG. 9B. This FIG. 9B shows an example that a display area from the left end of a virtual image based on each of input image data D11 and D15 is set.

In addition, a position of this display area can be changed according to the data of the display area set in the address control circuit 105 and control device 107 according to the inversion position indication information data which is set by a user and is inputted from the outside.

As mentioned above, although the embodiments of this invention are specifically explained, this invention is not limited to the above-described embodiments, but various kinds of modifications based on the technical idea of this invention are possible.

For example, the numerical values cited in the above-described embodiments are only as examples, and may be numerical values different from these as required.

For example, in the above-described first embodiment, although the inversion position C is made x/2 in FIGS. 3 and 4, column inversion coordinates of this inversion position C are only as examples. Hence, it is also possible to select other arbitrary column inversion coordinates, and it is not necessary to be always a half of all the column inversion coordinates (x/2). In addition, the display examples shown in FIGS. 6 and 9B are only examples for explanation, and do not always show that inversion processing is executed in the center of a display screen.

In addition, for example, as an input signal adopted in the above-described embodiments, any one of an interlace signal and a progressive signal may be used, and hence, it is not always limited to either signal.

Furthermore, for example, in the above-described embodiments, although the inversion processing for every line is explained, this does not aims at limiting the processing for every line. Even if a system, which scans a plurality of lines and displays an image, such as a system which scans two adjacent lines simultaneously and displays an image, that is, a so-called line double is adopted, this invention is applicable and the same effect can be obtained.

Moreover, the FIFO is a temporary memory device for relaxing the difference between a transfer rate of image data inputted into a memory part positioned in a subsequent stage, and the speed of writing image data in the memory part. Hence, in the case of such configuration that the transfer rate of image data adapts to the image data writing speed of a memory part beforehand, it is not necessary to always use the FIFO.

This application claims priority from Japanese Patent Application No. 2004-137627 filed May 6, 2004, which is hereby incorporated by reference herein.

What is claimed is:

1. An image signal processing circuit, comprising:
a line buffer for storing image signals per each line;
a frame memory capable of storing the image signals for plural lines; and
a control circuit which controls the line buffer and the frame memory,
wherein the control circuit performs the controlling such that the image signals for plural lines stored in the frame memory are outputted to the line buffer in an order opposite to an order of storing of lines in the frame memory, the image signals outputted from the frame memory are stored in the line buffer, and the image signals stored in the line buffer are outputted in an order opposite to the order of inputting of the image signals into the line buffer, and
wherein the control circuit performs the controlling such that:
(a) when the image signals stored in the frame memory are output, a part of the image signals stored is outputted to the line buffer in the same order as the order of inputting of lines into the frame memory, while the other part of the image signals is outputted to the line buffer in an order opposite to the order of inputting of lines into the frame memory; and
(b) a part of the image signals stored in the line buffer is outputted in the same order as the order of inputting of lines into the line buffer, while the other part of the image signals stored in the line buffer is outputted in an order opposite to the order of inputting of lines into the line buffer.

2. An image display apparatus, comprising:
the image signal processing circuit according to claim 1; and
a display which performs display on the basis of a signal outputted from the image signal processing circuit.

3. An image signal processing circuit, comprising:
a line buffer storing, per each line, image signals that are sequentially inputted;
a frame memory capable of storing image signals for a plurality of lines outputted from the line buffer; and
a control circuit which controls the line buffer and the frame memory,
wherein the control circuit controls such that, a part of the image signals stored in the line buffer is outputted into the frame memory in the same order as the order of inputting the image signals into the line buffer, while the other part of the image signals stored in the line buffer is outputted into the frame memory in the opposite order as the order of inputting the image signal into the line buffer, and the image signals outputted from the line buffer are inputted sequentially into the frame memory to store therein the image signals for the plurality of lines, and wherein a part of the image signals for the plurality of lines stored in the frame memory is outputted from the frame memory in the same order as the order of inputting the lines of the image signals into the frame memory, while the other part of the image signals for the lines stored in the frame memory is outputted from the frame memory in the opposite order as the order of inputting the lines of the image signals for the plurality of lines into the frame memory.

4. An image display apparatus, comprising:

the image signal processing circuit according to claim 3; and a display which performs display on the basis of a signal outputted from the image processing circuit.

5. An image signal processing circuit, comprising:

a line buffer for storing, per each line, image signals that are sequentially inputted;

a frame memory capable of storing image signals for a plurality of lines outputted from the line buffer; and a control circuit which controls the line buffer and the frame memory, wherein the control circuit controls such that, at the outputting of the image signals stored per each line in the line buffer, a part of the image signals stored in the line buffer is outputted into the frame memory in the same order as the order of inputting the image signals into the line buffer, while the other part of the image signals stored in the line buffer is outputted into the frame memory in the opposite order as the order of inputting the image signal into the line buffer, and wherein at the storing line by line of the image signals of the plurality of lines into the frame memory, a part of the image signals for the plurality of lines outputted from the line buffer is stored into the frame memory in the same order as the order of inputting the lines of the image signals into the frame memory, while the other part of the image signals for the plurality of lines outputted from the line buffer is stored into the frame memory in an order opposite to the order of inputting the lines of the image signals into the frame memory.

6. An image display apparatus, comprising:

the image signal processing circuit according to claim 5; and a display which performs display on the basis of a signal outputted from the image processing circuit.

* * * * *